Oct. 15, 1957 R. H. BUBE ET AL 2,810,052

ELECTRICAL DEVICES, INCLUDING CADMIUM SULPHIDE AND CADMIUM SELENIDE CONTAINING TRIVALENT CATIONS

Filed Aug. 28, 1953

INVENTORS
RICHARD H. BUBE &
CHARLES J. BUSANOVICH

BY J. L. Whittaker
ATTORNEY

United States Patent Office 2,810,052

Patented Oct. 15, 1957

2,810,052

ELECTRICAL DEVICES, INCLUDING CADMIUM SULPHIDE AND CADMIUM SELENIDE CONTAINING TRIVALENT CATIONS

Richard H. Bube and Charles J. Busanovich, Princeton, N. J., assignors to Radio Corporation of America, a corporation of Delaware Application August 28, 1953, Serial No. 377,216

13 Claims. (Cl. 201—63)

This invention relates to a method of producing cadmium sulphide and cadmium selenide and more particularly to a method of producing cadmium sulphide and cadmium selenide having improved electrical properties.

Cadmium sulphide and cadmium selenide can be produced in a variety of ways. One method is to react cadmium metal in gaseous form with a gas containing sulphur or selenium below the sublimation temperature of the reaction product, and then allowing crystals of the reaction product to grow in the region where the reaction takes place. Another method is to precipitate the material from an aqueous solution and then to recrystallize the precipitate by heating to an elevated temperature. Cadmium sulphide and cadmium selenide films may be prepared by evaporation onto a cooler surface.

The dark conductivity of very pure cadmium sulphide or cadmium selenide made by any of the ordinary methods is of the order of about $10^{-12}$ mhos per centimeter, and therefore these materials are considered to be electrically-insulating. Conductivity, in the present case, refers to the ability of a crystal to pass an electric current and is the reciprocal of the resistivity of the material. Both terms are used in this application as defined by the A. I. E. E. in "Definitions of Electric Terms" approved August 12, 1941. This conductivity, when measured for an illuminated crystal, is referred to as the light conductivity of the material; and when measured for the same material in darkness is referred to as the dark conductivity of the crystal. Photoconductivity is the process whereby the conductivity of a material increases due to irradiation with light. Photosensitivity as used in this application refers to the change in the amount of electric current passed by the material due to irradiation with light. This is measured in amperes of additional current passed by the material per lumen of light. The photosensitivity of very pure cadmium sulphide and cadmium selenide is of the order of 50 microamperes per lumen.

The incorporation of certain very small proportions of certain impurities in crystals of cadmium sulphide and cadmium selenide increases the photosensitivity of the material by a factor of at least a hundred thousand and also increases the dark conductivity of the crystal. The incorporation of excessive proportions of these impurities, however, results in a decrease in photosensitivity below the peak value and a further increase in dark conductivity. Cadmium sulphide and cadmium selenide crystals having the distinguishing properties of being insulating, or conducting or highly photosensitive, all are commercially useful. For example, insulating material may be used in electrostatic photography and television camera tubes. The conducting material may be used in broad area rectifiers. The high photosensitivity material may be used in photocells, light amplifiers and simple switches.

A copending application of R. H. Bube and S. M. Thomsen, Serial No. 349,661, filed April 20, 1953, describes a method of making cadmium sulphide and cadmium selenide having predetermined conductivity and photosensitivity by the incorporation of certain impurities into the material. By this process, conducting-type cadmium sulphide or cadmium selenide is prepared by reacting gaseous cadmium with a sulphur- or selenium-containing gas in the presence of a halide. After the conducting-type material is prepared, silver or copper cations are diffused into the material to reduce its conductivity. The process of reducing the conductivity of cadmium sulphide and cadmium selenide by diffusing silver or copper into the crystal lattice of the material is more fully described in the copending application of S. M. Thomsen, Serial No. 345,825, filed March 31, 1953, now Patent Number 2,742,438. Two different impurities are required in Thomsen's method. A halide must first be incorporated to make the materials conducting, and then silver or copper must be incorporated to reduce the conductivity of the material to a desired value. The incorporation of minimum amounts of impurities and a minimum number of method steps to accomplish the desired electrical features are desirable commercial features.

An object of the instant invention is to provide an improved method for producing cadmium sulphide and cadmium selenide.

Another object of this invention is to provide an improved method for producing conducting-type cadmium sulphide and cadmium selenide.

A further object of this invention is to provide an improved method for producing cadmium sulphide and cadmium selenide having predetermined electrical conductivities.

Another object of this invention is to provide an improved method for producing crystals of cadmium sulphide and sadmium selenide having a predetermined photosensitivity.

Another object of this invention is to provide an improved method for producing large discrete crystals of cadmium sulphide and cadmium selenide having predetermined electrical conductivities.

A further object of this invention is to provide cadmium sulphide and cadmium selenide having improved electrical properties, and to provide devices which include these materials.

In general the present invention includes a process for increasing the electrical conductivity of a crystalline material selected from the group consisting of cadmium sulphide and cadmium selenide which comprises incorporating trivalent cations into the material. The preferred trivalent cations are aluminum, gallium, and indium. The invention also includes an improved process of making a material having a predetermined conductivity which comprises making a crystalline, electrically-insulating material selected from the group consisting of cadmium sulphide and cadmium selenide and then incorporating trivalent cations into the material. The invention also includes materials made by the above-mentioned processes and devices including these materials.

The novel features of the invention, both as to its organization as well as additional advantages thereof, will be set forth in greater detail in the following description in conjunction with the accompanying drawings in which.

Figure 1:
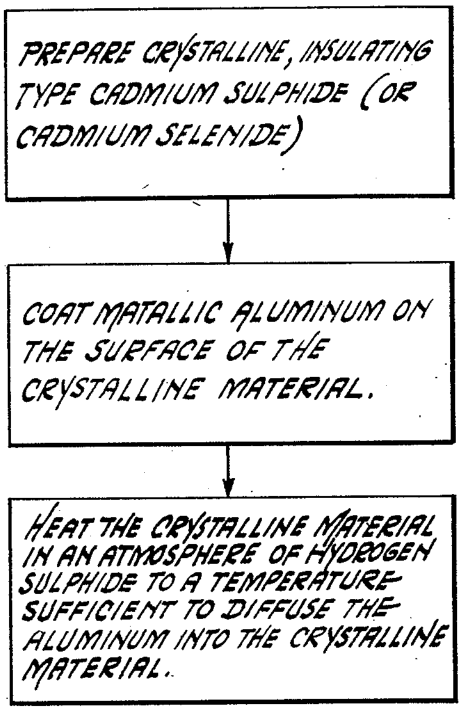
Figure 1 is a flow chart giving steps in a preferred method in accordance with the invention for preparing cadmium sulphide or cadmium selenide.

Referring now to Figure 1, pure crystalline cadmium sulphide or cadmium selenide is first prepared according to any known methods. The crystalline material is then coated with metallic aluminum, for example, by evaporating aluminum metal onto the surface of the material. The coated cadmium sulphide is then heated in an atmosphere of hydrogen sulphide to a temperature sufficient to diffuse the aluminum into the cadmium sulphide crystals. The photosensitivity and conductivity of the material may be controlled by controlling the amount of aluminum which is coated on the surface of the cadmium sulphide crystals.

*Example*

Crystalline insulating-type cadmium sulphide is first prepared. A suitable method is described by Richard H. Bube and Soren M. Thomsen, in their copending application, Serial No. 345,086, filed March 27, 1953 (now abandoned). This method comprises reacting gaseous cadmium metal with a sulphur-containing gas at a temperature below the sublimation temperature of cadmium sulphide. Cadmium sulphide crystallizes on suitable substrates in the reaction zone. By controlling the rates of flow of the gaseous material and the temperature of the reaction, large discrete crystals, polycrystalline masses, or fine crystalline powders may be obtained. By this method, very pure crystalline cadmium sulphide is formed having a resistivity of the order of $10^{12}$ ohm-centimeters.

Figures 2, 3:
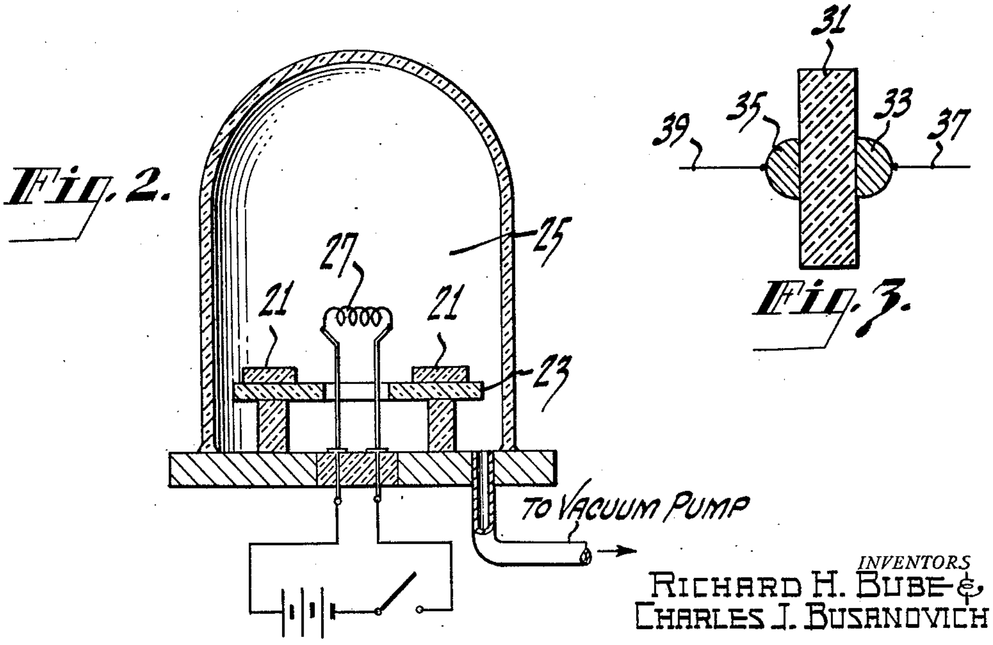
Figure 2 is a sectional elevational view of a vacuum apparatus for coating aluminum metal on cadmium sulphide.
Figure 3 is a sectional elevational view of a device incorporating a body of material of the instant invention.

Pure aluminum metal is coated on the surface of the cadmium sulphide crystals in proportion of about 50 parts of aluminum per million parts of cadmium sulphide. Referring now to Figure 2, a suitable method of coating aluminum on cadmium sulphide is by evaporation in a vacuum. By this method, crystals 21 of cadmium sulphide are placed on a suitable support 23 in a vacuum chamber 25. An electric resistance wire 27 coated with aluminum is located somewhat above the crystals and a calculated distance therefrom. The chamber 25 is evacuated to about $1\times10^{-4}$ mm. Hg, and then an electric current is passed through the resistance wire 27. The aluminum metal evaporates from the wire and deposits on the cadmium sulphide crystals below. The cadmium sulphide with the aluminum metal coated thereon is then removed from the vacuum chamber and heated for about 20 minutes at about 700° C. in an atmosphere of hydrogen sulphide. The heat treatment diffuses the aluminum metal coating into the cadmium sulphide.

The cadmium sulphide produced in the first step has a resistivity of about $10^{12}$ ohm-centimeters and a photosensitivity of about 50 microamperes per lumen. The final products including about 50 parts of aluminum per million parts of cadmium sulphide has a resistivity of about $10^8$ ohm-centimeters and a photosensitivity of about 2½ million microamperes per lumen.

The following chart shows the effects of coating various amounts of metallic aluminum, gallium, or indium on crystalline cadmium sulphide and then diffusing the impurity into the cadmium sulphide by firing at about 700° C. for about 20 minutes in an atmosphere of hydrogen sulphide.

| Impurity | Parts per Million Parts of CdS | Resistivity, ohm-cm. | Sensitivity, μa./lumen |
|---|---|---|---|
| | ---------- | $10^{12}$ | 50 |
| Al | 10 | $10^{12}$ | 50 |
| Al | 20 | $10^{12}$ | 20,000 |
| Al | 40 | $10^{9}$ | 1,000,000 |
| Al | 50 | $10^{8}$ | 2,500,000 |
| Al | 60 | $10^{6}$ | 5,000,000 |
| Al | 100 | $10^{4}$ | 1,000,000 |
| Al | 500 | $10^{2}$ | ---------- |
| Ga | 1 | $10^{10}$ | 100,000 |
| Ga | 2 | $10^{9}$ | 300,000 |
| Ga | 4 | $10^{5}$ | 1,000,000 |
| Ga | 10 | $10^{4}$ | 4,000,000 |
| Ga | 20 | $10^{2}$ | 5,000,000 |
| In | 1 | $10^{9}$ | 300,000 |
| In | 3 | $10^{6}$ | 2,000,000 |
| In | 4 | $10^{5}$ | 3,000,000 |
| In | 10 | $10^{2}$ | ---------- |

It will be noted that the incorporation of between 20 and 100 parts of aluminum per million parts of cadmium sulphide produces an improved photosensitivity. However, the greatest improvement occurs when about 60 parts per million of aluminum is incorporated. It should also be noted that increasing amounts of aluminum increases the conductivity in the material. Up to about 500 parts of aluminum per million parts of cadmium sulfide, the conductivity of the crystal increases. Using the higher proportions of aluminum a crystal suitable as a broad area rectifier is obtained. Thus by coating a predetermined amount of aluminum, a definite conductivity and photosensitivity may be obtained.

Any cation that may be incorporated in the trivalent state may be used in place of aluminum. However, the preferred cations are aluminum, gallium, and indium. In the case of gallium and indium, somewhat smaller proportions of these cations are necessary in order to obtain optimum results.

In the case of gallium, as shown in the table, using about 1–20 parts per million parts of cadmium sulphide produces a crystal having desirable photosensitive properties. But the amount of gallium, as in the case of aluminum, can be increased above 20 parts per million and up to about 500 parts per million in order to obtain a crystal having conductivity suitable for making a broad area rectifier. There is no need to increase the amount of gallium above about 20 parts per million, however, since no great increase in conductivity is obtained by using the higher proportions.

In the case of indium, as shown in the table, using only about 1–4 parts per million parts of cadmium sulphide produces a crystal having desirable photosensitivity. A crystal with 10 parts per million has conductivity suitable for rectifiers and, if the proportion of indium is increased up as high as 500 parts per million the material is still suitable for broad area rectifiers.

The firing to diffuse the cation into the crystal preferably may be carried out in any atmosphere, such as nitrogen, helium, neon, and argon, which is inert to the materials. The preferred atmosphere is hydrogen sulphide. The firing time may be varied between about 5 and 60 minutes, preferably 20 minutes, and the firing temperature may be varied between about 600° and 900° C., preferably 700° C. Both of these parameters are a compromise between providing conditions for the maximum mobility of the cation and the minimum loss of material by sublimation.

The step of coating the cadmium sulphide particles may be carried out by any of the known methods. The coating may be metallic or any other form. It is only necessary for the coating to provide trivalent cations to the cadmium sulphide upon heating.

While the foregoing example describes a process of preparing photosensitive cadmium sulphide, the process is equally satisfactory for cadmium selenide. The process described may be applied to cadmium sulphide and cadmium selenide in the form of large discrete crystals or in the form of fine crystalline powders.

As previously stated, crystals made as above described may be utilized for making devices such as photocells or rectifiers, for example.

Figure 3 illustrates a broad-area rectifier which incorporates a body of material produced according to the invention. A crystal 31 of cadmium sulphide is prepared by coating 500 parts of aluminum metal per million parts of cadmium sulphide on the crystal and then heating the crystal to about 700° C. according to the method of this invention. A piece of indium metal is shaped into an electrode 35, by any of the commonly known methods, for example, casting, rolling, punching, and stamping. A surface of the electrode 35 so formed is pressed against a surface of the crystal 31 of cadmium sulphide so that the two surfaces are in intimate physical and hence ohmic contact with each other. In order to facilitate physical contact between surfaces, the electrode 35 may be warmed for a fraction of a minute in a non-oxidizing atmosphere. A drop of silver paste is suitably shaped and then pressed against the opposite side of the crystal 31 to form a rectifying electrode 33. Suitable lead wires 37 and 39, for the electrodes 33, 35, respectively, are attached by usual methods. This general type of rectifier is more fully described in U. S. patent application 357,179, filed May 25, 1953, by Roland W. Smith.

Also referring to Figure 3, a photosensitive cell may be made with a body of material prepared according to the invention. As in the case of the rectifier, a crystal 31 of cadmium sulphide is prepared but now the crystal is preferably coated with about 50 parts of aluminum metal per million parts of cadmium sulphide. The coated crystal is then heated for about 20 minutes at a temperature of about 700° C. in an atmosphere of hydrogen sulphide to diffuse the aluminum into the crystal. A pair of electrodes 33 and 35 are then attached to the crystal but both are of the ohmic contact type and may be made of indium as described above.

There has thus been described an improved method for making cadmium sulphide and cadmium selenide with predetermined electrical conductivity and photosensitivity and devices utilizing the improved material.

What is claimed is:

1. A process of increasing the electrical conductivity of crystals of a material selected from the group consisting of cadmium sulphide and cadmium selenide which comprises evaporating a metal selected from the group consisting of 20–500 parts aluminum, 1–500 parts gallium, and 1–500 parts indium per million parts of said crystalline material on said crystals and then heating said crystals in an inert atmosphere to a temperature between about 600° C. and about 900° C.

2. The process according to claim 1 wherein said metal is aluminum.

3. The process according to claim 1 wherein said metal is gallium.

4. The process according to claim 1 wherein said metal is indium.

5. A process of increasing the electrical conductivity of cadmium sulphide crystals which comprises evaporating onto said crystals about 20 to about 500 parts of aluminum per million parts of cadmium sulphide and then heating said crystals at about 600° C. to about 900° C. in an atmosphere of hydrogen sulphide.

6. A process of making cadmium sulphide crystals having a high photosensitivity which comprises preparing electrically-insulating cadmium sulphide crystals, evaporating onto said crystals about 50 parts of aluminum per million parts of cadmium sulphide, and then heating said crystals at about 700° C. in an atmosphere of hydrogen sulphide for about 20 minutes.

7. A process of making cadmium selenide crystals which comprises preparing electrically-insulating cadmium selenide crystals, evaporating onto said crystals about 20–500 parts of aluminum per million parts of cadmium selenide, and then heating said crystals at about 600° to 900° C. in an atmosphere of hydrogen sulphide to diffuse the aluminum into the cadmium selenide.

8. A process of making cadmium selenide crystals having a high photosensitivity which comprises preparing electrically-insulating cadmium selenide crystals, evaporating onto said crystals about 50 parts of aluminum per million parts of cadmium selenide, and then heating said crystals to about 700° C. in an atmosphere of hydrogen sulphide for about 20 minutes.

9. An electrical device comprising a pair of electrodes in contact with a body of crystalline cadmium sulphide containing per million parts of crystalline material trivalent cations selected from the group consisting of 20–500 parts of aluminum, 1–500 parts of gallium, and 1–500 parts of indium.

10. An electrical device comprising a pair of electrodes in contact with a body of crystalline cadmium selenide containing per million parts of crystalline material trivalent cations selected from the group consisting of 20–500 parts of aluminum, 1–500 parts of gallium, and 1–500 parts of indium.

11. A broad area rectifier comprising a crystal of cadmium sulphide having about 500 parts of aluminum per million parts of cadmium sulphide incorporated therein and a pair of electrodes attached to said crystal.

12. A photocell comprising a crystal of cadmium sulphide having about 50 parts of aluminum per million parts of cadmium sulphide incorporated therein and a pair of electrodes attached to said crystal.

13. An electrical device comprising a pair of electrodes in contact with a body of crystalline material selected from the group consisting of cadmium sulphide and cadmium selenide containing, per million parts of said crystalline material, trivalent cations selected from the group consisting of 20 to 500 parts of aluminum, 1 to 500 parts of gallium, and 1 to 500 parts of indium.

References Cited in the file of this patent

UNITED STATES PATENTS

| | | |
|---|---|---|
| 2,659,678 | Cusano et al. | Nov. 17, 1953 |
| 2,662,060 | Kroger | Dec. 8, 1953 |

OTHER REFERENCES

Acad. des Sciences Comptes Rendus, v. 230, March 6, 1950, pp. 947–949.